United States Patent [19]

Sachse

[11] 4,310,580

[45] Jan. 12, 1982

[54] SHEETING OF MULTILAYER ANTIDRUMMING LINING MATERIAL

[76] Inventor: Erhard Sachse, Reiterweg 6a, 6148 HP-Kirschhausen, Fed. Rep. of Germany

[21] Appl. No.: 143,637

[22] Filed: Apr. 25, 1980

[30] Foreign Application Priority Data

May 3, 1979 [DE] Fed. Rep. of Germany ....... 2917802

[51] Int. Cl.$^3$ .............................................. B32B 5/12
[52] U.S. Cl. .................................... 428/109; 428/131; 428/138; 428/192; 428/247; 428/255; 428/489; 428/920; 428/291
[58] Field of Search ............... 428/105, 107, 108, 109, 428/131, 138, 255, 247, 489, 192, 920, 291

[56] References Cited

U.S. PATENT DOCUMENTS

| | | | |
|---|---|---|---|
| 3,198,689 | 8/1965 | Lansing | 428/255 |
| 3,214,320 | 10/1965 | Lappala et al. | 428/255 |
| 3,949,111 | 4/1976 | Pelletier | 428/109 |
| 4,056,645 | 11/1977 | Henry | 428/131 |

*Primary Examiner*—James J. Bell

[57] ABSTRACT

A sheeting of multilayer antidrumming lining material, viz. a film containing bitumen or plastic, or a combination film containing bitumen and plastic, which is backed with a wide-meshed fabric having a high tensile strength. This high-tensile fabric backing prevents the antidrumming film, on the one hand, from cracking and, on the other, it holds it even when in a plasticized condition on the upper edge of a steeply inclined or vertical sheet metal component, so that the piece of antidrumming film hanging thereon cannot slide off. Also, due to the backing fabric, the film does not flap away outwardly and upwardly in the area where a steep descent starts. Finally, the tensile strength of the plasticized film is increased such that it cannot crack under the influence of gravity in the area of vertical sides. Where strongly localized form fitting adaptation of the sheeting of antidrumming lining material to the shape of a substrate is required, a few areas of the sheeting of antidrumming lining material do not have any backing material. Also cutaway portions which are adapted to the requirements of the curved sheet metal component to be deadened can be provided. Advantageously, the edges of the cutaway portion are also reinforced with extra pieces of a wide-meshed fabric to afford additional protection against deformation.

10 Claims, 5 Drawing Figures

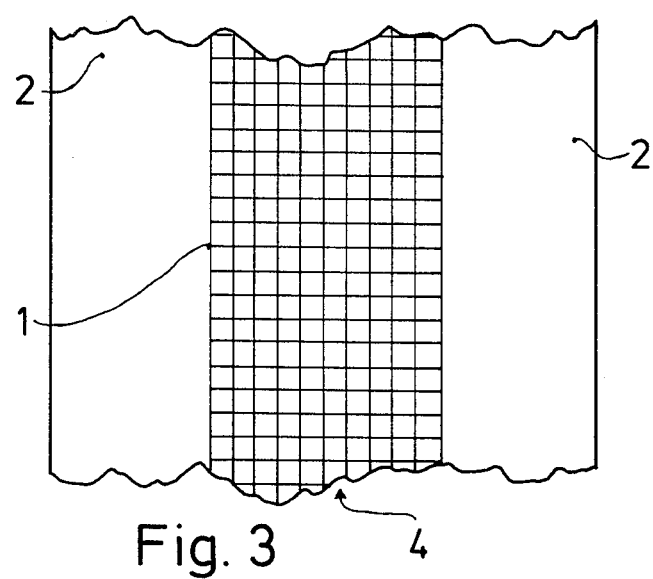
Fig. 3
Fig. 4
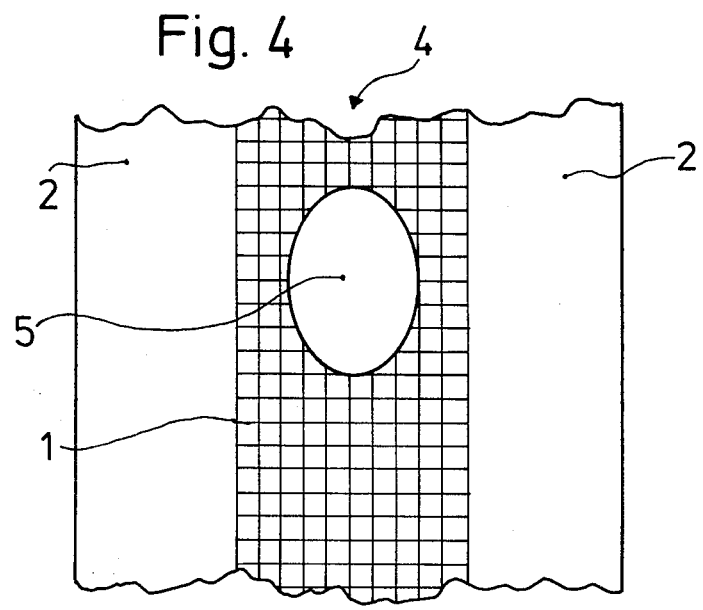

and the metal sheets of the transmission and propeller-shaft tunnels of automobiles. That is, to reduce the oscillatory capability of these substrates or metal sheets to dampen these vibrations.

SHEETING OF MULTILAYER ANTIDRUMMING LINING MATERIAL

BACKGROUND OF THE INVENTION

1. Field of the Invention

The invention relates to a sheeting of multilayer antidrumming lining material.

In general, the purpose of such sheeting of multilayer antidrumming lining material is to deaden vibrating substrates, more particularly bottom plates and the metal sheets of the transmission and propeller-shaft tunnels of automobiles. That is, to reduce the oscillatory capability of these substrates or metal sheets to dampen these vibrations.

2. Description of the Prior Art

To accomplish the foregoing, the substrates or metal sheets of motor vehicles are covered with antidrumming films. These sheetings of antidrumming lining material preferably consist of films containing bitumen a few millimeters thick. However, they are normally designed not only to achieve the antidrumming of the metal sheets, but also to withstand a fabrication process in the car factory which is integrated into the enamel baking. For this purpose, the antidrumming films are first placed on the chassis plates; this applies especially to the propeller-shaft tunnel on which is laid a special cut of antidrumming film, just like a saddle on the back of a horse. The chassis is then run through a paint oven in which prevail temperatures of about 180°. The average passage time is about 30 minutes. In this paint oven, the antidrumming film fuses onto the chassis plate. To this end, antidrumming films are employed which plasticize in the paint oven and adapt to the contours of the metal sheets, so that a sound-conducting connection is produced between the chassis plate and the antidrumming film.

Particularly the strongly curved propeller-shaft tunnel requires excellent melting capacity and flowability of the antidrumming films, so that the neighboring bottom parts, too, are covered by the antidrumming film. A number of technological problems arise which, particularly in the case of the propeller-shaft tunnel, are attributable to the fact that in the normal position its sides are vertical, with the result that film areas along the vertical sides of the propeller-shaft tunnel, after they have been put on loosely, are not actually in contact with the vertical sheet metal components and consequently, during plastification, cannot fuse thereonto but tend to flow away.

A further problem is that the piece of antidrumming film for a propeller-shaft tunnel must often have a free cutaway portion so as to provide space for an opening in the top side of the propeller-shaft tunnel for the transmission gear shift lever. Now, during plastification of the antidrumming film, it is frequently observed that the edge against the side portions of the propeller-shaft tunnel flaps away therefrom, or flips over and fuses in a disorderly manner with the metal sheet. If, on the other hand, an antidrumming film is chosen which does not plasticize sufficiently in the paint over so as not to flap away from the vertical walls of the propeller-shaft tunnel, then the antidrumming film does not fuse at all onto the heavily curved parts of the substrate of the metal sheet of the propeller-shaft tunnel, since it does not follow the curves thereof.

Another reason for failure is that the steeply projecting exterior portions of the antidrumming film fuse in the bottom area next to the propeller-shaft tunnel before the film sufficiently softens and plasticizes, and thus cannot adapt to the contour of the propeller-shaft tunnel. The film is thus tensioned, hanging to a certain extent freely from the upper part of the propeller-shaft tunnel to the bottom. Then, at the instant of plastification, the film cracks under the influence of gravity.

SUMMARY OF THE INVENTION

It is an object of the present invention to provide an antidrumming film which can be fused in the paint over onto the substrate or chassis plate as described above and which can also adapt fully to heavily curved chassis components, such as a propeller-shaft tunnel.

A further object is an antidrumming film which fuses flawlessly onto vertical sheet metal components and which cannot crack on heavily inclined or vertical sheet metal components when in the plasticized condition.

According to the present invention, the foregoing objects are achieved by a new sheeting of multilayer antidrumming lining material, viz. a film containing bitumen and/or plastic and/or a mixed film containing bitumen and plastic which is backed with a wide-meshed fabric having a high tensile strength. This high-tensile fabric backing prevents the antidrumming film, on the one hand, from cracking and, on the other, it holds it even when in a plasticized condition on the upper edge of a steeply inclined or vertical sheet metal component, so that the piece of antidrumming film hanging thereon cannot slide off. Also, due to the backing fabric, the film does not flap away outwardly and upwardly in the area where a steep descent starts. Finally, the tensile strength of the plasticized film is increased such that it cannot crack under the influence of gravity in the area of vertical sides.

In areas of the substrate or of the chassis plates which require a strongly localized form fitting adaptation of the sheeting of antidrumming lining material to the shape of the substrate, particularly in the case of beads pressed thereon, a few areas of the sheeting of antidrumming lining material embodying the principles of the invention remain without backing.

For this purpose in a preferred embodiment of the invention, only the middle portion of the sheeting of antidrumming lining material is backed with fabric. Thus, on both sides of the middle portion an unbacked film strip remains which still has a very high degree of flowability when heated to a plasticized state.

It is thus ensured that even in these areas there is a complete running in of beads. Since a wide-meshed high-tensile fabric backing always allows a degree of deformation due to shear, even in the backed area form fitting adaptation to the shape of the sheet metal base is still possible to some extent.

In another embodiment of the invention, the middle portion of the antidrumming film backed with fabric has cutaway portions which are adapted to the requirements of the curved sheet metal component to be deadened. Particularly in the case of propeller-shaft tunnels, a cutaway portion in the antidrumming film according to the invention corresponds, for example, to an opening in the tunnel ceiling through which a transmission gearshift lever is normally passed. Advantageously, the edges of the cutaway portion are also reinforced with extra pieces of a wide-meshed fabric to afford additional protection against deformation.

The sheeting of multilayer antidrumming film according to the present invention is particularly formed from a backed film which plasticizes at a high temperature normally prevailing in the paint oven, viz. about 180° C., but which is solid at room temperature, whereas the wide mesh backing fabric remains solid both at room and high temperatures. A jute fabric is preferably employed for the backing, but a high-tensile and heat-resistant paper, or jute and paper combination may also be utilized. These backing agents may be lamination-coated both on the top and bottom side of the film. However, the film may also be backed on one side only or, if necessary, on both sides, with a plastic film.

To impart tensile strength to the borders of the sheeting of multilayer antidrumming lining material in another embodiment of the invention the border areas thereof are also specially backed. The backing fabric, especially when paper is used, may be impregnated with flame-proofing agents.

A practical example of the sheeting of multilayer antidrumming lining material according to the invention will now be described with reference to the accompanying drawings, wherein like numerals refer to like parts throughout.

BRIEF DESCRIPTION OF THE DRAWINGS

FIG. 3 is a top view of the sheeting of antidrumming lining material according to the invention, wherein only the central portion thereof is backed with fabric;

FIG. 4 is a top view of the sheeting of antidrumming lining material as shown in FIG. 3, but with a cutaway portion in the middle;

DESCRIPTION OF THE PREFERRED EMBODIMENTS

Figure 1:
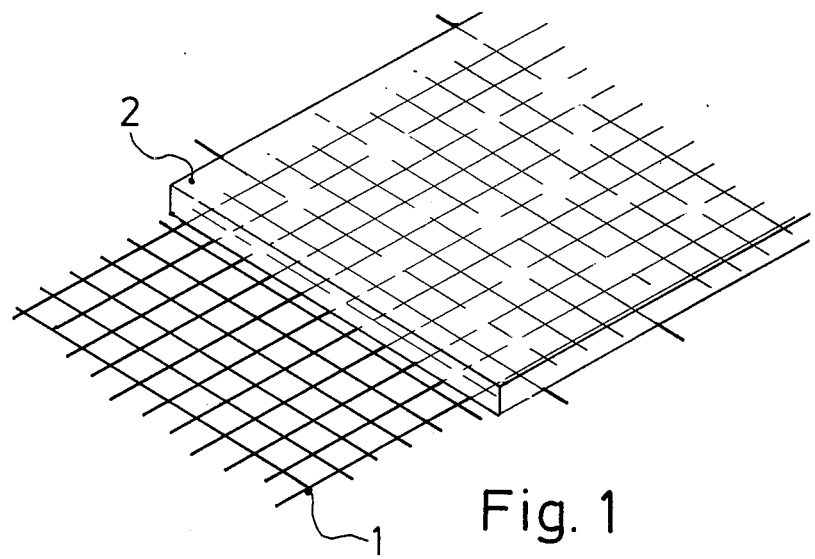
FIG. 1 is a perspective view of a sheeting of the antidrumming lining material according to the invention.

The foreground of FIG. 1 shows a wide-meshed fabric 1 having a high tensile strength. This fabric is used to back one side of the film 2, which is more particularly a film containing bitumen and plastic, or either bitumen or plastic per se, which plasticizes in the paint oven. Film 2 may also be a multilayer film which, in addition, may also be backed with reinforcing fabric on the top side.

Figure 2:
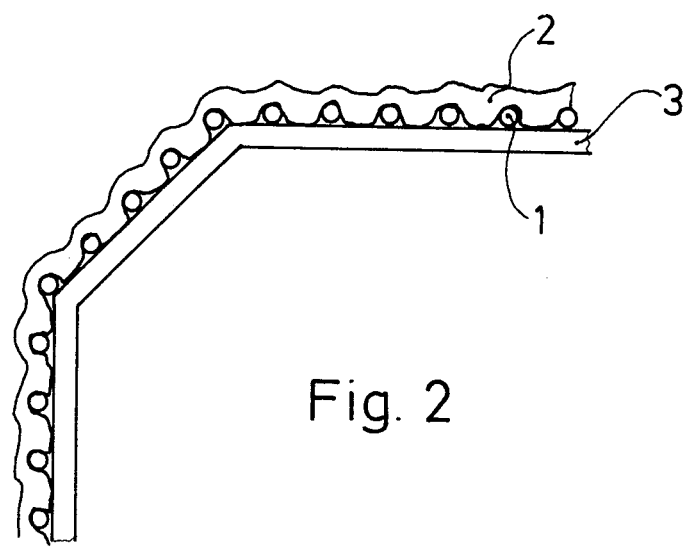
FIG. 2 is a cross-sectional view of the sheeting of antidrumming lining material melted onto a substrate.

FIG. 2 shows how the sheeting 1, 2 of antidrumming lining material has conformed to a heavily curved substrate 3. The film 2 has flown during plastification through the wide-meshed fabric 1, so that it has melted onto the substrate 3. The wide-meshed high-tensile fabric 1 has ensured that the sheeting of antidrumming lining material made according to the present invention does not tear open or separate in the area of the inclination and of the vertical part of the substrate 3, (e.g., these areas of the metal sheet of the propeller-shaft tunnel), so that an antidrumming effect can no longer be expected.

FIG. 3 is a top view of a preferred embodiment of the sheeting of antidrumming lining material according to the invention, wherein only the middle portion 4 is backed with fabric 1, thus leaving strips of unbacked film 2 on both sides of the middle portion 4. The middle portion 4 is dimensioned so that it covers the curved part of the sheet metal component, while the unbacked side areas 2 of the antidrumming film will rest on the boundary areas of the sheet metal component to be deadened. When in the plasticized condition, the backed middle portion 4 assures the inherently stable fusion of the sheeting of antidrumming lining material onto the curved sheet metal parts, while the unbacked boundary areas of the film 2 assure a proper run of the beads.

FIG. 4 is a top view of another embodiment of the sheeting of antidrumming lining material having a cutaway portion 5 in the middle portion 4 backed with fabric 1. This cutaway portion 5 corresponds to an opening in the curved sheet metal component. For example, in the case of a propeller-shaft tunnel to be deadened, it corresponds to an opening in the top part of the tunnel through which the transmission gearshift lever normally projects.

In a still further embodiment of the invention, the borders of the cutaway portion 5 are additionally reinforced with extra pieces of meshed fabric so as to make the edges inherently stable.

Figure 5:
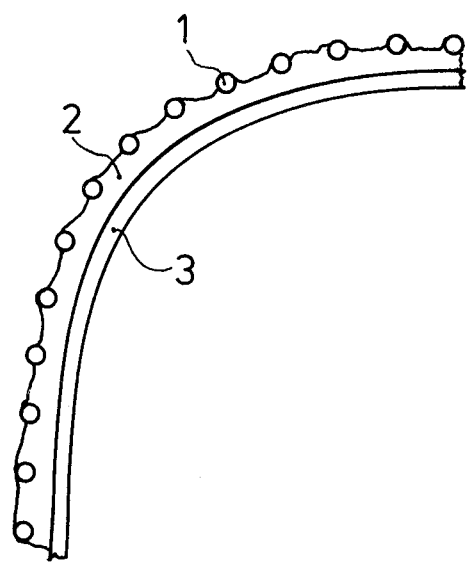
FIG. 5 is a cross-sectional view of a sheeting of antidrumming lining material melted onto a curved substrate, similar to the showing in FIG. 2, but with the fabric lying on top, or the outside rather than the inside.

FIG. 5 is a cross-sectional view showing how the sheeting of antidrumming lining material has conformed to a curved substrate after plastification. In this embodiment, the sheeting of antidrumming lining material has the wide-meshed fabric 1 lying on the top surface of the film 2 as fused with the substrate 3. This substrate 3 may, for example, be the metal sheet of a propeller-shaft tunnel. The high-tensile wide-meshed fabric 1 prevents the plasticized film 2 from flowing down the vertical portion of the substrate 3, or flapping away therefrom. Thus, the entire surface of the substrate 3 has been flawlessly covered by the sheeting of antidrumming lining material according to the invention and thus deadened.

The many advantages of the sheeting of multilayer antidrumming lining material as made according to the subject invention are seen in the fact that substrates shaped in any manner, more particularly chassis plates and metal sheets of propeller-shaft tunnels of automobiles, can be deadened in a fabrication process integrated with the enamel baking. The backing of the sheeting of antidrumming lining material with a wide-meshed high-tensile fabric does not hamper the plastification of the film nor its fusion onto the substrate, and yet assures the non-deformability and stability of the film while in the plasticized condition.

The unbacked side areas of the sheeting antidrumming lining material assure a flawless run of the side beads in the immediate vicinity of the curved sheet metal component. In addition, cutaway portions that match openings in the sheet metal component to be deadened may be arranged in the reinforced middle portion, so that a flawless deadening can be achieved up to the immediate vicinity of the opening in the sheet metal component.

Thus, the film can no longer tear open or drop off from the vertical chassis components, and yet can conform to substrates curved in any manner. The fabric backing may be eliminated in areas where a positive form fitting localized adaptation of the sheeting of antidrumming lining material to a run of the beads of the substrate is necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the acope of the invention.

I claim:

1. A sheeting of multilayer antidrumming lining material which can be fused onto curved tunnel-like sheet metal components, comprising:
   a film of plasticizable material,
   a reinforcing backing of a wide-meshed fabric having a high tensile strength, said backing fabric being arranged in the middle of the film for covering particularly vertical parts of the tunnel-like sheet metal components, cutaway portions being provided in the middle of the film for the purpose of extending to the vicinity of vertically descending parts of the tunnel-like sheet metal components, and the edges of the cutaway portions are reinforced with additional pieces of wide-meshed fabric.

2. A sheeting of antidrumming lining material according to claim 1, wherein the film plasticizes at a high temperature of about 180° C., and solidifies at room temperature, and said wide-meshed fabric has a high tensile strength both at said high temperature and at room temperature.

3. A sheeting of antidrumming lining material according to claim 1, wherein said wide-meshed fabric consists of jute and paper.

4. A sheeting of antidrumming lining material according to claim 1, wherein said wide-meshed fabric is flame-proof.

5. A sheeting of antidrumming lining material according to claim 1, wherein said sheeting is backed with a plastic film.

6. A sheeting of antidrumming lining material according to claim 1, wherein the boundary areas of the film intended for upper regions of vertically descending sheet metal components are backed.

7. A sheeting of antidrumming lining material according to claim 1, wherein a few areas of the film are free of backing, so that the film can conform to the run of beads of the sheet metal components.

8. A sheeting of antidrumming lining material according to claim 1, wherein the plasticizable material for the film consists of a mixture of bitumen and plastic.

9. A sheeting of antidrumming lining material according to claim 1, wherein the plasticizable material for the film consists of bitumen.

10. A sheet of antidrumming lining material according to claim 1, wherein the plasticizable material for the film consists of plastic.

* * * * *

UNITED STATES PATENT AND TRADEMARK OFFICE
CERTIFICATE OF CORRECTION

PATENT NO. : 4,310,580

DATED : January 12, 1982

INVENTOR(S) : Erhard Sachse

It is certified that error appears in the above—identified patent and that said Letters Patent is hereby corrected as shown below:

On the title page insert:

--(73) Assignee: Chemie-Werk Weinsheim GmbH, Germany --.

Signed and Sealed this

Eleventh Day of May 1982

[SEAL]

Attest:

GERALD J. MOSSINGHOFF

Attesting Officer

Commissioner of Patents and Trademarks